United States Patent
Lenz et al.

(10) Patent No.: US 7,279,514 B2
(45) Date of Patent: Oct. 9, 2007

(54) HIGH-MOLECULAR-WEIGHT POLYMERIC MATERIAL COMPRISING DIKETOPYRROLOPYRROLE PIGMENTS

(75) Inventors: Roman Lenz, Liestal (CH); Gerardus De Keyzer, Riehen (CH); Olof Wallquist, Therwil (CH); Taher Yousaf, Basel (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/521,651

(22) PCT Filed: Jul. 8, 2003

(86) PCT No.: PCT/EP03/07336

§ 371 (c)(1),
(2), (4) Date: Jan. 13, 2005

(87) PCT Pub. No.: WO2004/007604

PCT Pub. Date: Jan. 22, 2004

(65) Prior Publication Data

US 2005/0261402 A1 Nov. 24, 2005

(30) Foreign Application Priority Data

Jul. 17, 2002 (CH) .................... 1250/02

(51) Int. Cl.
*C08K 5/3417* (2006.01)
*C07D 209/00* (2006.01)

(52) U.S. Cl. .............. 524/92; 546/167; 546/256; 548/453; 428/480; 428/704

(58) Field of Classification Search ............. 524/92, 524/104; 546/167, 256, 272; 548/453; 428/480, 428/704
See application file for complete search history.

(56) References Cited

U.S. PATENT DOCUMENTS

| | | | |
|---|---|---|---|
| 4,579,949 A | 4/1986 | Rochat et al. | 546/167 |
| 5,738,719 A | 4/1998 | Wallquist et al. | 106/498 |

FOREIGN PATENT DOCUMENTS

EP 0748851 12/1996

WO 02/10288 2/2002

*Primary Examiner*—Kriellion A Sanders
(74) *Attorney, Agent, or Firm*—Joseph C. Suhadolnik; Tyler A. Stevenson (57) ABSTRACT

The present invention relates to high-molecular-weight polymeric material comprising at least one diketopyrrolopyrrole pigment of formula (1) wherein $R_1$, is hydrogen, chlorine, methyl, methoxy, $CF_3$ or CN, $R_2$ is hydrogen, chlorine, methyl, methoxy, $CF_3$ or CN, A is hydrogen, chlorine, methyl, mehtoxy, $CF_3$, CN, unsubstituted or substituted phenyl or a radical of formula (2), (2a) or (2b), wherein $R_5$ is hydrogen, chlorine, methyl, methoxy, nitro, $CF_3$ or CN and $R_6$ is hydrogen, chlorine, methyl, methoxy, nitro, $CF_3$ or CN, or $R_5$ and $R_6$ together with the phenyl ring to which they are bonded form an aryl or a heteroaryl and $A_1$ is a radical of formula (2), (2a) or (2b), to the preparation of that material and to the use thereof in colour filters, and to novel diketopyrrolopyrrole pigments.

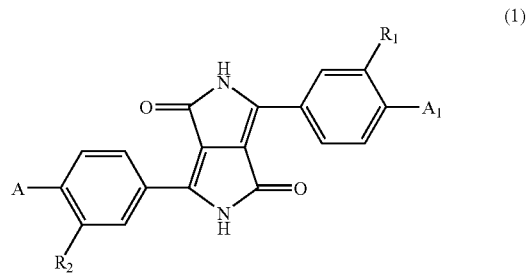

(1)

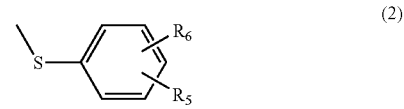

(2)

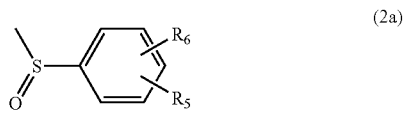

(2a)

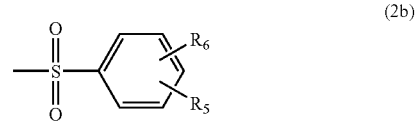

(2b)

13 Claims, 1 Drawing Sheet

Fig. 1

HIGH-MOLECULAR-WEIGHT POLYMERIC MATERIAL COMPRISING DIKETOPYRROLOPYRROLE PIGMENTS

The invention relates to a high-molecular-weight organic material the pigmentation of which consists of extremely fine particles, the pigmentation comprising at least one pigment from the class of diketopyrrolopyrrole compounds, and to novel diketopyrrolopyrrole pigments. That material is preferably employed in the form of thin layers that are built up in one or more layers in the form of patterns on a transparent substrate and can be used as optical colour filters.

Colour filters are an extremely exacting technology which also demands very high standards of the colouring agents. Three pigmentation processes that are fundamentally different in principle are known for the production of colour filters. A number of variants thereof is described in Displays 14/2, 115 (1993).

For example, it is possible to use colorants that can be completely dissolved in a binder, in a conventional solvent or in a solution of the binder in a conventional solvent. According to JP-A-08/44050, a colour strength of $\geq 2.8$ is possible for a film thickness of $\leq 1.25$ µm. Disadvantages of the colorants are their inadequate thermal stability and fastness to light.

On the other hand, it is also possible to use dispersions of pigments that are completely insoluble in a binder or in a conventional solvent or are soluble therein only in an extremely low concentration. A number of variants of that method has been disclosed in Journal of the SID 1/3, 341-346 (1993) and at the IDW'95 (Contribution CF-3, pages 57 to 60 of the printed version). In order to obtain the necessary particle fineness corresponding to a very high specific surface, prolonged grinding with the application of high friction energy is required. According to Contribution CF-5 at the IDW'95 (pages 65 to 68 of the printed version), the particle size is to be very fine, 0.1 µm maximum.

A third alternative consists of chemically modifying pigments in such a manner that they are completely soluble in a ready-for-use mixture of a binder and a conventional solvent. After coating and the usual further processing, the pigment can be regenerated, the pigment precursors having to undergo a reaction that obviously requires a high activation energy.

The formulation of extremely fine pigments in such a manner that the coloristic properties conforming to exact standards are obtained is therefore extremely difficult by the previously known methods.

The production of colour filters by sequential application of a red, blue and green colouring agent to a suitable substrate, such as, for example, amorphous silicon, is also described in GB-A-2 182 165. The colour filters can be coated, for example, using inks, especially printing inks, comprising the diketopyrrolopyrrole pigments used according to the invention, or can be produced, for example, by mixing the diketopyrrolopyrrole pigments used according to the invention with chemically, thermally or photochemically structurable high-molecular-weight material. The further production can be carried out, for example, analogously to EP-A-654 711 by application to a substrate, e.g. glass used for LCD, subsequent photo-structuring and development. Other documents that describe the production of colour filters are U.S. Pat. No. 5,624,467 and WO 98/45756.

For the production of colour filters pigments of the diketopyrrolopyrrole class, so-called DPP pigments, have also been used for some time.

For example, EP-A-704 497 describes mixed crystals and solid solutions of symmetrical diketopyrrolopyrroles that are isomorphous with the crystal structure of an asymmetrical diketopyrrolopyrrole and can be used for pigmenting high-molecular-weight organic substances.

EP-A-654 506 discloses synergistic pigment mixtures that can be used in plastics materials, surface coatings or printing inks, it being possible also for pigments of the diketopyrrolopyrrole class inter alia to be used.

EP-A-340 968 discloses an electrolytic process for the production of pigmented thin layers, diketopyrrolopyrrole Red 254 (C.I. Pigment Red 254) inter alia being used as pigment.

The alternative method, by which pigments are chemically modified in such a manner that they are completely soluble in a ready-for-use mixture of a binder and a conventional solvent and are regenerated after coating and the usual further processing, is described, for example, in EP-A-654 711 and EP-A-742 255, diketopyrrolopyrrole Red 255 (C.I. Pigment Red 255) inter alia being used as pigment.

The DPP pigments used for the production of colour filters up to the present time, however, have the disadvantage inter alia that they do not block out a specific blue-tinged red shade with high transparency.

There is therefore a need for new DPP pigments that have such a blue-tinged red shade in terms of their hue, are coloristically pure and are distinguished by having a high transparency.

Surprisingly, it has now been found that the DPP pigments used according to the invention largely satisfy the above-mentioned criteria.

The present invention accordingly relates to a high-molecular-weight polymeric material comprising at least one diketopyrrolopyrrole pigment (DPP pigment) of formula wherein
$R_1$ is hydrogen, chlorine, methyl, methoxy, $CF_3$ or CN,
$R_2$ is hydrogen, chlorine, methyl, methoxy, $CF_3$ or CN,
A is hydrogen, chlorine, methyl, methoxy, $CF_3$, CN, unsubstituted or substituted phenyl or a radical of formula -continued wherein
$R_5$ is hydrogen, chlorine, methyl, methoxy, nitro, $CF_3$ or CN and
$R_6$ is hydrogen, chlorine, methyl, methoxy, nitro, $CF_3$ or CN, or
$R_5$ and $R_6$ together with the phenyl ring to which they are bonded form an aryl or a heteroaryl ring and
$A_1$ is a radical of formula wherein
$R_5$ is hydrogen, chlorine, methyl, methoxy, nitro, $CF_3$ or CN and
$R_6$ is hydrogen, chlorine, methyl, methoxy, nitro, $CF_3$ or ON, or
$R_5$ and $R_6$ together with the phenyl ring to which they are bonded form an aryl or a heteroaryl ring.

Preference is given to a high-molecular-weight polymeric material comprising at least one diketopyrrolopyrrole pigment (DPP pigment) of formula wherein
$R_1$ is hydrogen, chlorine, methyl, methoxy, $CF_3$ or CN,
$R_2$ is hydrogen, chlorine, methyl, methoxy, $CF_3$ or CN,
$R_3$ is hydrogen, chlorine, methyl, methoxy and
$R_4$ is hydrogen, chlorine, methyl, methoxy or
$R_3$ and $R_4$ together with the phenyl ring to which they are bonded form a heteroaryl, and
A is hydrogen, chlorine, methyl, methoxy, $CF_3$, CN, unsubstituted or substituted phenyl or a radical of formula wherein
$R_5$ is hydrogen, chlorine, methyl, methoxy, nitro, $CF_3$ or CN and
$R_6$ is hydrogen, chlorine, methyl, methoxy, nitro, $CF_3$ or CN.
$R_1$ is preferably hydrogen, chlorine or methyl, especially hydrogen or chlorine.
$R_2$ is preferably hydrogen, chlorine or methyl, especially hydrogen or chlorine.
$R_3$ is preferably hydrogen, methyl or methoxy.
$R_4$ is preferably hydrogen, methyl or methoxy.
$R_5$ is preferably hydrogen, methyl or methoxy.
$R_6$ is preferably hydrogen, methyl or methoxy.
A is preferably hydrogen, chlorine, methyl, phenyl or a radical of formula (2).

The present invention further relates to diketopyrrolopyrrole pigments of formula (1)

wherein
$R_1$ is hydrogen, chlorine, methyl, methoxy, $CF_3$ or CN,
$R_2$ is hydrogen, chlorine, methyl, methoxy, $CF_3$ or CN,
A is hydrogen, chlorine, methyl, methoxy, $CF_3$, CN, unsubstituted or substituted phenyl or a radical of formula wherein
$R_5$ is hydrogen, chlorine, methyl, methoxy, nitro, $CF_3$ or CN and $R_6$ is hydrogen, chlorine, methyl, methoxy, nitro, $CF_3$ or CN, or $R_5$ and $R_6$ together with the phenyl ring to which they are bonded form an aryl or a heteroaryl ring and $A_1$ is a radical of formula wherein

$R_5$ is hydrogen, chlorine, methyl, methoxy, nitro, $CF_3$ or CN and $R_6$ is hydrogen, chlorine, methyl, methoxy, nitro, $CF_3$ or CN, or $R_5$ and $R_6$ together with the phenyl ring to which they are bonded form an aryl or a heteroaryl ring, with the proviso that, when both of A and $A_1$ are a radical of formula (2), $R_5$ cannot be hydrogen and

$R_6$ cannot be methyl bonded in the 4-position.

Preference is given to diketopyrrolopyrrole pigments of formula wherein $R_1$ is hydrogen, chlorine, methyl, methoxy, $CF_3$ or CN,
$R_2$ is hydrogen, chlorine, methyl, methoxy, $CF_3$ or CN,
$R_3$ is hydrogen, chlorine, methyl, methoxy and
$R_4$ is hydrogen, chlorine, methyl, methoxy or
$R_3$ and $R_4$ together with the phenyl ring to which they are bonded form a heteroaryl, and
A is hydrogen, chlorine, methyl, methoxy, $CF_3$, CN, unsubstituted or substituted phenyl or a radical of formula wherein

$R_5$ is hydrogen, chlorine, methyl, methoxy, nitro, $CF_3$ or CN and $R_6$ is hydrogen, chlorine, methyl, methoxy, nitro, $CF_3$ or CN, with the proviso that, when A is a radical of formula (2), $R_3$ and $R_5$ cannot be hydrogen and $R_4$ and $R_5$ cannot be methyl bonded in the 4-position.

The diketopyrrolopyrrole pigments of formula (1) according to the invention are prepared analogously to generally known preparation methods for diketopyrrolopyrroles as described in U.S. Pat. No. 4,579,949, by first reacting, for example, a nitrile of formula wherein $R_1$ is as defined above and X is a leaving group, with a compound of formula wherein $R_5$ and $R_6$ are as defined above, and then with a succinic acid diester, or by oxidising a compound of formula resulting from the compounds of formulae (50) and (51) to a compound of formula or to a compound of formula and then reacting with a succinic acid diester, or by first reacting a mixture of two nitrites of formulae

-continued (52)

wherein R$_1$ and R$_2$ are as defined above and X is a leaving group, with a compound of formula (51)

(51a)

wherein R$_5$ and R$_6$ are as defined above, and then reacting with a succinic acid diester, or by oxidising a mixture of compounds of formulae (51b)

(51bb)

resulting from the compounds of formulae (50), (52) and (51) to a mixture of compounds of formulae (51c)

(51cc)

or to a mixture of compounds of formulae (51d)

(51dd)

and then reacting with a succinic acid diester.

X as a leaving group is to be understood as being, for example, a fluorine, chlorine, bromine, iodine, nitro or sulfo group.

The two nitriles of formulae (50) and (52) can be used in a molar ratio of from 99:1 to 1:99, and advantageously in a molar ratio of 1:1, to each other.

The nitrites of formulae (50) and (52) and the compounds of formulae (51), (51a), (51b), (51bb), (51c), (51cc), (51d) and (51dd) are known or can be prepared analogously to generally known processes.

The diketopyrrolopyrrole pigments of formula (1) according to the invention might also be prepared analogously to a method described in EP-A-1 073 659.

According to the invention, preference is given to diketopyrrolopyrrole pigments of formula (1) that have a transmission at 570-580 nm of less than 5% and a transmission at 615 nm of at least 80% and preferably 85%.

High-molecular-weight organic materials are understood as being those having a molecular weight of approximately from $10^3$ to $10^7$ g/mol.

Special preference is given to high-molecular-weight organic material based on acrylates or methacrylates.

The pigmented high-molecular-weight organic material according to the invention is coated onto a transparent substrate as a layer having a thickness of preferably $\leq 20$ µm, especially $\leq 10$ µm, more especially $\leq 5$ µm. In the case of a plurality of layers, each individual layer is preferably $\leq 5$ µm in thickness, especially $\leq 2$ µm. The substrate preferably has at from 400 to 700 nm a transparency of $\geq 90\%$ throughout, especially $\geq 95\%$, more especially $\geq 98\%$ throughout. Preferably, both the substrate and all layers are flat, the surface roughness thereof being especially $\leq 0.1$ µm. Glass or polycarbonate film, for example, can be used as flat substrates.

Other preferred properties of colour filters are known to the person skilled in the art and are to be found, for example, in the relevant literature or in the publications already mentioned.

Preference is given to a transparent substrate to which a red, a blue and a green layer have been applied in any desired sequence, a red DPP pigment of formula (1) according to the invention being used together with known blue and green compounds.

The treatment that is subsequently carried out where applicable will be one of the conventional, known after-treatments, such as, for example, thermal curing or treatment with a developing bath.

The pigmented high-molecular-weight organic materials according to the invention have a high colour strength, brilliance and transparency. They are eminently suitable for the production of red colour filters for visible light in the range of from 400 to 700 nm.

The invention further relates to a method of modifying the spectrum of a visible light beam by selective absorption of a portion of the radiation by means of a coloured medium, which method comprises using as the coloured medium a pigmented high-molecular-weight polymeric material according to the invention applied to a transparent substrate.

The present invention further relates accordingly to the colour filters produced with the high-molecular-weight polymeric material comprising at least one diketopyrrolopyrrole pigment.

The colour filters according to the invention can be used with excellent results in liquid crystal displays, plasma displays or electro-luminescent displays. The latter may be, for example, active (twistnematic) or passive (supertwistnematic) ferroelectric displays or light-emitting diodes.

The following Examples serve to illustrate the invention. Unless stated otherwise, parts therein are parts by weight and percentages are percentages by weight. Temperatures are given in degrees Celsius. The relationship between parts by weight and parts by volume is the same as that between grams and cubic centimetres:

EXAMPLE 1a

A mixture consisting of 68.8 g (0.5 mol) of 4-chlorobenzonitrile, 103.7 g (0.75 mol) of potassium carbonate and 500 ml of dimethylacetamide is placed in a laboratory reaction flask. 52.2 g (0.51 mol) of thiophenol are added dropwise to that mixture over a period of 1.5 hours at room temperature and with stirring. The reaction mixture is then stirred at 110° C. for 14 hours and is then cooled to room temperature. The cooled reaction mixture is discharged into a two-component mixture consisting of 1000 ml of diethyl ether and 800 ml of water, and the organic phase is separated off and then washed four times with 500 ml of water each time and once with 300 ml of a saturated sodium chloride solution. After drying over magnesium sulfate, the solvent is removed in vacuo. 86.4 g (82% of the theoretical yield) of a compound of formula (53)

are obtained.

The compounds listed in Table 1 can be prepared analogously to the process described in Example 1a)

TABLE 1

| starting material 1 | starting material 2 | compound |
|---|---|---|
| 2-naphthylthiol | 4-chlorobenzonitrile | (structure) |
| 4-methylthiophenol | 4-chlorobenzonitrile | (structure) |
| 4-methoxythiophenol | 4-chlorobenzonitrile | (structure) |
| 4-nitrothiophenol | 4-chlorobenzonitrile | (structure) |
| thiophenol | 3,4-dichlorobenzonitrile | (structure) |
| 4-methylthiophenol | 3,4-dichlorobenzonitrile | (structure) |

EXAMPLE 1b:

In a laboratory reaction flask, 10.35 g (0.45 mol) of sodium and 100 ml of tert-amyl alcohol are heated under reflux for 12 hours at a temperature of from 110 to 115° C. To the resulting clear solution there is added dropwise at 105° C., with stirring, over a period of 3 hours, a mixture consisting of 42.3 g (0.2 mol) of the compound of formula (53) from Example 1a, 24.8 ml (0.12 mol) of succinic acid diisopropyl ester and 50 ml of tert-amyl alcohol.

A further 4.14 ml (0.02 mol) of succinic acid diisopropyl ester is then added dropwise over a period of 1 hour. When the addition is complete, the resulting dark-red suspension is maintained at 105° C., with stirring, for a further 30 minutes and is then cooled to 15° C. The suspension is then discharged into a mixture consisting of 500 ml of water, 100 ml of methanol and 36.8 g (0.6 mol) of acetic acid at a temperature below −5° C. and is stirred at that temperature for 12 hours to complete the reaction.

Figure 1:
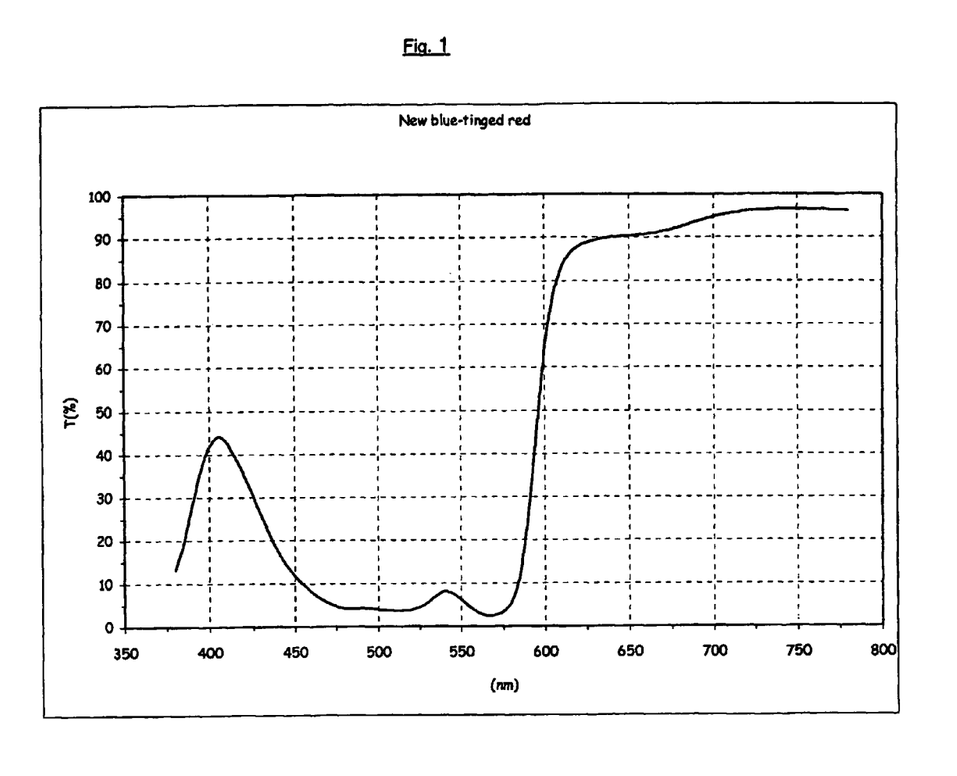
FIG. 1 is a UV/Vis Spectrum of the pigment of formula 100 prepared in Example 1b.

The finely particulate pigment suspension obtained in that manner is filtered off and washed with 1500 ml of methanol and 2000 ml of water. Drying in vacuo at 80° C. yields 41.1 g (81% of the theoretical yield) of a red pulverulent compound of formula (100)

having the spectrum indicated in FIG. 1, which in PVC results in a transparent blue-tinged red coloration.

The diketopyrrolopyrrole pigments listed in Table 2 can be prepared analogously to the process described in Example 1b)

TABLE 2

| starting material | diketopyrrolopyrrole pigment | shade |
|---|---|---|
| | | blue-tinged red |
| | | blue-tinged red |
| | | blue-tinged red |

TABLE 2-continued

| starting material | diketopyrrolopyrrole pigment | shade |
|---|---|---|
|  |  | blue-tinged red |
|  |  | blue-tinged red |

EXAMPLE 2

A mixture consisting of 34.38 g (0.25 mol) of 4-chlorobenzonitrile, 51.22 g (0.31 mol) of anhydrous sodium benzenesulfinate and 3500 ml of N,N-dimethylacetamide is placed in a laboratory reaction flask and heated at a temperature of from 140 to 152° C. for 5 hours and stirred at 120° C. for 15 hours to complete the reaction. The resulting yellow suspension is cooled and the solvent is removed in vacuo in a rotary evaporator. The resulting solid residue is taken up in 1.5 litres of water, filtered and washed with 1.4 litres of water. Drying in vacuo yields 57.9 g (95% of the theoretical yield) of a pale-yellow compound of formula (54)

EXAMPLE 3

The procedure is analogous to Example 2 except that 56.8 g of anhydrous sodium 4-toluenesulfinate are used instead of the sodium benzenesulfinate. 59.2 g (92% of the theoretical yield) of a pale-yellow compound of formula (55)

are obtained.

EXAMPLE 4

In a laboratory reaction flask, 2.58 g (0.112 mol) of sodium and 60 ml of tert-amyl alcohol are heated under reflux for 12 hours at a temperature of from 110 to 115° C. To the resulting clear solution there is added dropwise at 105° C., with stirring, over a period of 3 hours a mixture consisting of 12.15 g (0.05 mol) of the compound of formula (54) from Example 2, 9.04 g (0.07 mol) of succinic acid diisopropyl ester and 60 ml of tert-amyl alcohol.

When the addition is complete, the resulting dark-red suspension is maintained at 105° C., with stirring, for a further 30 minutes and is then cooled to room temperature. The suspension is then discharged into a mixture consisting of 250 ml of water, 50 ml of methanol and 9.0 g (0.15 mol) of acetic acid at a temperature below 30° C. and is stirred at room temperature for 15 hours to complete the reaction.

The finely particulate pigment suspension obtained in that manner is filtered off and washed with 1000 ml of methanol and 500 ml of water. After drying in vacuo at 90° C., 12.9 g (91% of the theoretical yield) of a red pulverulent compound of formula (101)

are obtained, which in PVC results in a transparent blue-tinged red coloration.

EXAMPLE 5

The procedure is analogous to Example 4 except that, instead of compound (54), an equimolar amount of the compound of formula (55) is used. A red pulverulent compound of formula (102)

is obtained in a yield of 95%, which in PVC results in a transparent blue-tinged red coloration.

EXAMPLE 6

Production of a red colour filter 8.35 g of the DPP pigment from Example 1b, 0.42 g of a quinacridone mixture comprising the compound of formula (103)

$X + Y \leq 10$ 0.42 g of a sulfonated diketopyrrolopyrrole prepared according to Example 1 a+b of GB-A-2 238 550, 0.35 g of Solsperse® 22'000 (Avecia), 1.75 g of Solsperse® 24'000 (Avecia) and 40.0 g of propylene glycol monomethyl ether acetate (MPA, CAS Reg. No 108-65-6) are loaded into a 180 ml glass vessel containing 235 g of zircon ceramic balls and stirred at 20° C., using a Dispermat, at 1000 rev/min for 10 minutes and at 3000 rev/min for 180 minutes. After the addition of 14.3 g of an acrylate polymer binder (40% solution in MPA), the mixture is further stirred at 3000 rev/min for 30 minutes at room temperature. After removal of the balls, the dispersion is diluted with the same amount by weight of MPA.

On a spin-coating apparatus, a glass substrate (Corning Type 1737-F) is coated with that dispersion and spun at 1000 rev/min for 30 seconds. Drying of the layer is carried out at 100° C. for 2 minutes and at 200° C. for 5 minutes on a heating plate. The layer thickness obtained is between 0.4 and 0.5 µm.

EXAMPLE 7

Production of a red colour filter 8.35 g of the DPP pigment from Example 1b, 0.42 g of a dihydroquinacridone compound of formula (104)

0.42 g of a sulfonated diketopyrrolopyrrole prepared according to Example 1a+b of GB-A-2 238 550, 0.35 g of Solsperse® 22'000 (Avecia), 1.75 g of Solsperse® 24'000 (Avecia) and 40.0 g of propylene glycol monomethyl ether acetate (MPA, CAS Reg. No 108-65-6) are loaded into a 180 ml glass vessel containing 235 g of zircon ceramic balls and stirred at 20° C., using a Dispermat, at 1000 rev/min for 10 minutes and at 3000 rev/min for 180 minutes. After the addition of 14.3 g of an acrylate polymer binder (40% solution in MPA), the mixture is further stirred at 3000 rev/min for 30 minutes at room temperature. After removal of the balls, the dispersion is diluted with the same amount by weight of MPA.

On a spin-coating apparatus, a glass substrate (Corning Type 1737-F) is coated with that dispersion and spun at 1000 rev/min for 30 seconds. Drying of the layer is carried out at 100° C. for 2 minutes and at 200° C. for 5 minutes on a heating plate. The layer thickness obtained is between 0.4 and 0.5 µm.

The colour filters produced with the diketopyrrolopyrrole pigments used according to the invention are distinguished by a high transmission of the colour dots.

What is claimed is:

1. A high-molecular-weight polymeric material comprising at least one diketopyrrolopyrrole pigment (DPP pigment), which pigment has a particle size of less than or equal to 0.1 µm, has a transmission at 570-580 nm of less than 5% and a transmission at 615 nm of at least 80%, and consists of compounds of formula (1)

wherein
R₁ is hydrogen, chlorine, methyl, methoxy, CF₃ or CN, R₂ is hydrogen, chlorine, methyl, methoxy, CF₃ or CN, A is hydrogen, chlorine, methyl, methoxy, CF₃, CN, unsubstituted or substituted phenyl or a radical of formula (2)

(2a)

(2b)

wherein
R₅ is hydrogen, chlorine, methyl, methoxy, nitro, CF₃ or CN and R₆ is hydrogen, chlorine, methyl, methoxy, nitro, CF₃ or CN, or R₅ and R₆ together with the phenyl ring to which they are bonded form an aryl or a heteroaryl ring and
A₁ is a radical of formula (2)

(2a)

(2b)

wherein
R₅ is hydrogen, chlorine, methyl, methoxy, nitro, CF₃ or CN and R₆ is hydrogen, chlorine, methyl, methoxy, nitro, CF₃ or CN, or R₅ and R₆ together with the phenyl ring to which they are bonded form an aryl or a heteroaryl ring.

2. A diketopyrrolopyrrole pigment, which pigment has a particle size of less than or equal to 0.1 μm, has a transmission at 570-580 nm of less than 5% and a transmission at 615 nm of at least 80%, and consists of compounds of formula (1)

wherein
R₁ is hydrogen, chlorine, methyl, methoxy, CF₃ or CN, R₂ is hydrogen, chlorine, methyl, methoxy, CF₃ or CN, A is hydrogen, chlorine, methyl, methoxy, CF₃, CN, unsubstituted or substituted phenyl or a radical of formula (2)

(2a)

(2b)

wherein
R₅ is hydrogen, chlorine, methyl, methoxy, nitro, CF₃ or CN and R₆ is hydrogen, chlorine, methyl, methoxy, nitro, CF₃ or CN, or R₅ and R₆ together with the phenyl ring to which they are bonded form an aryl or a heteroaryl ring and
A₁ is a radical of formula (2)

(2a)

(2b)

wherein
R₅ is hydrogen, chlorine, methyl, methoxy, nitro, CF₃ or CN and R₆ is hydrogen, chlorine, methyl, methoxy, nitro, $CF_3$ or CN, or $R_5$ and $R_6$ together with the phenyl ring to which they are bonded form an aryl or a heteroaryl ring, with the proviso that, when both of A and $A_1$ are a radical of formula (2), $R_5$ cannot be hydrogen and $R_6$ cannot be methyl bonded in the 4-position.

3. A diketopyrrolopyrrole pigment according to claim 2 of formula (1a)

wherein
$R_1$ is hydrogen, chlorine, methyl, methoxy, $CF_3$ or CN, $R_2$ is hydrogen, chlorine, methyl, methoxy, $CF_3$ or CN, $R_3$ is hydrogen, chlorine, methyl, methoxy and $R_4$ is hydrogen, chlorine, methyl, methoxy or $R_3$ and $R_4$ together with the phenyl ring to which they are bonded form a heteroaryl ring, and A is hydrogen, chlorine, methyl, methoxy, $CF_3$, CN, unsubstituted or substituted phenyl or a radical of formula (2)

wherein
$R_5$ is hydrogen, chlorine, methyl, methoxy, nitro, $CF_3$ or CN and $R_6$ is hydrogen, chlorine, methyl, methoxy, nitro, $CF_3$ or CN, with the proviso that, when A is a radical of formula (2), $R_3$ and $R_5$ cannot be hydrogen and $R_4$ and $R_6$ cannot be methyl bonded in the 4-position.

4. A process for the preparation of a diketopyrrolopyrrole pigment of formula (1) according to claim 2, which comprises first reacting a nitrile of formula (50)

wherein $R_1$ is as defined above and X is a leaving group, with a compound of formula (51)

or

-continued

(51a)

wherein $R_5$ and $R_6$ are as defined above, and then reacting with a succinic acid diester, or oxidising a compound of formula

(51b)

resulting from the compounds of formulae (50) and (51) to a compound of formula

(51c)

or to a compound of formula

(51d)

and then reacting with a succinic acid diester,
or first reacting a mixture of two nitriles of formulae

(50)

and

(52)

wherein $R_1$ and $R_2$ are as defined above and X is a leaving group, with a compound of formula (51)

-continued (51a)

wherein $R_5$ and $R_6$ are as defined above, and then reacting with a succinic acid diester, or oxidising a mixture of compounds of formulae (51b)

(51bb)

resulting from the compounds of formulae (50), (52) and (51) to a mixture of compounds of formulae (51c)

(51cc)

or to a mixture of compounds of formulae (51d)

(51dd)

and then reacting with a succinic acid diester to result in a suspension followed by discharging the suspension into a mixture comprising water, methanol and acetic acid at a temperature below 300° C., resulting in a pigment which has a particle size of less than or equal to 0.1 μm, has a transmission at 570-580 nm of less than 5% and a transmission at 615 nm of at least 80%.

5. A high-molecular-weight polymeric material according to claim 1 comprising at least one diketopyrrolopyrrole pigment, which pigment has a particle size of less than or equal to 0.1 μm, has a transmission at 570-580 nm of less than 5% and a transmission at 615 nm of at least 80%, and consists of compounds of formula (1a)

wherein
$R_1$ is hydrogen, chlorine, methyl, methoxy, $CF_3$ or CN, $R_2$ is hydrogen, chlorine, methyl, methoxy, $CF_3$ or CN, $R_3$ is hydrogen, chlorine, methyl, methoxy and $R_4$ is hydrogen, chlorine, methyl, methoxy or $R_3$ and $R_4$ together with the phenyl ring to which they are bonded form a heteroaryl ring, and A is hydrogen, chlorine, methyl, methoxy, $CF_3$, CN, unsubstituted or substituted phenyl or a radical of formula (2)

wherein
$R_6$ is hydrogen, chlorine, methyl, methoxy, nitro, $CF_3$ or CN and $R_0$ is hydrogen, chlorine, methyl, methoxy, nitro, $CF_3$ or CN.

6. A high-molecular-weight polymeric material according to claim 5, wherein, in formula (1a), $R_1$ is hydrogen, chlorine or methyl, $R_2$ is hydrogen, chlorine or methyl, $R_3$ is hydrogen, chlorine or methyl, $R_4$ is hydrogen, chlorine or methyl and A is hydrogen, chlorine, methyl or phenyl.

7. A high-molecular-weight polymeric material according to claim 5, wherein, in formula (1a), A is a radical of formula (2) in which $R_5$ is hydrogen, methyl or methoxy and $R_6$ is hydrogen, methyl or methoxy.

8. A high-molecular-weight polymeric material according to claim 1, wherein the high-molecular-weight organic material is based on acrylates or methacrylates.

9. A process for the production of colour filters, which process comprises applying a coating containing a diketopyrrolopyrrole pigment of formula (1) according to claim 1 to a transparent substrate or pigmenting a transparent substrate with said pigment.

10. A process for the production of colour filters according to claim 9, wherein the coating or transparent substrate comprises a high-molecular-weight polymeric material based on acrylates or methacrylates.

11. A colour filter comprising a diketopyrrolopyrrole pigment of formula (1) according to claim 2.

12. A high-molecular-weight polymeric material according to claim 6, wherein, in formula (1a), A is a radical of formula (2) in which $R_5$ is hydrogen, methyl or methoxy and R6 is hydrogen, methyl or methoxy.

13. A colour filter comprising a high-molecular-weight polymeric material according to claim 1.

* * * * *